Sept. 3, 1963 C. M. MOSTRONG Re. 25,439
PLANT BED SHAPER
Original Filed Feb. 18, 1959 3 Sheets-Sheet 1
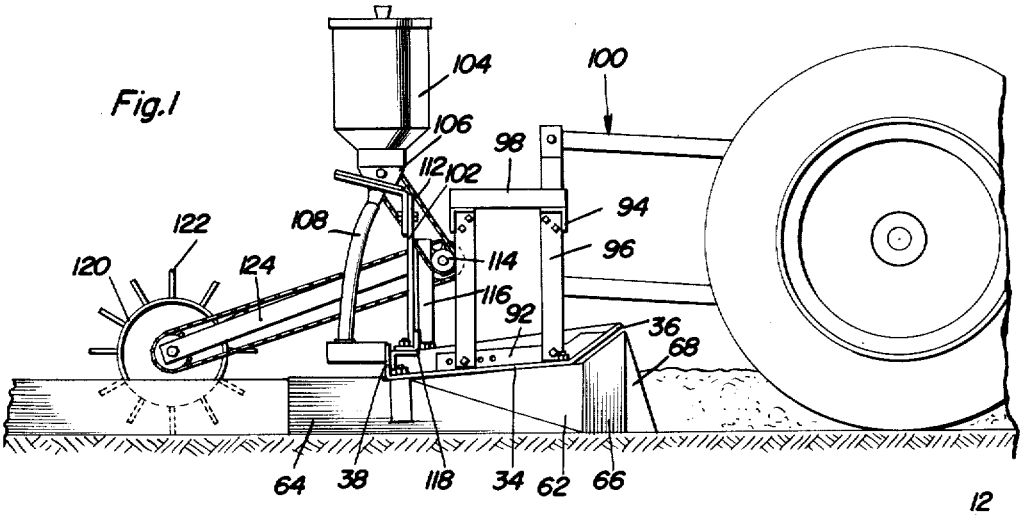
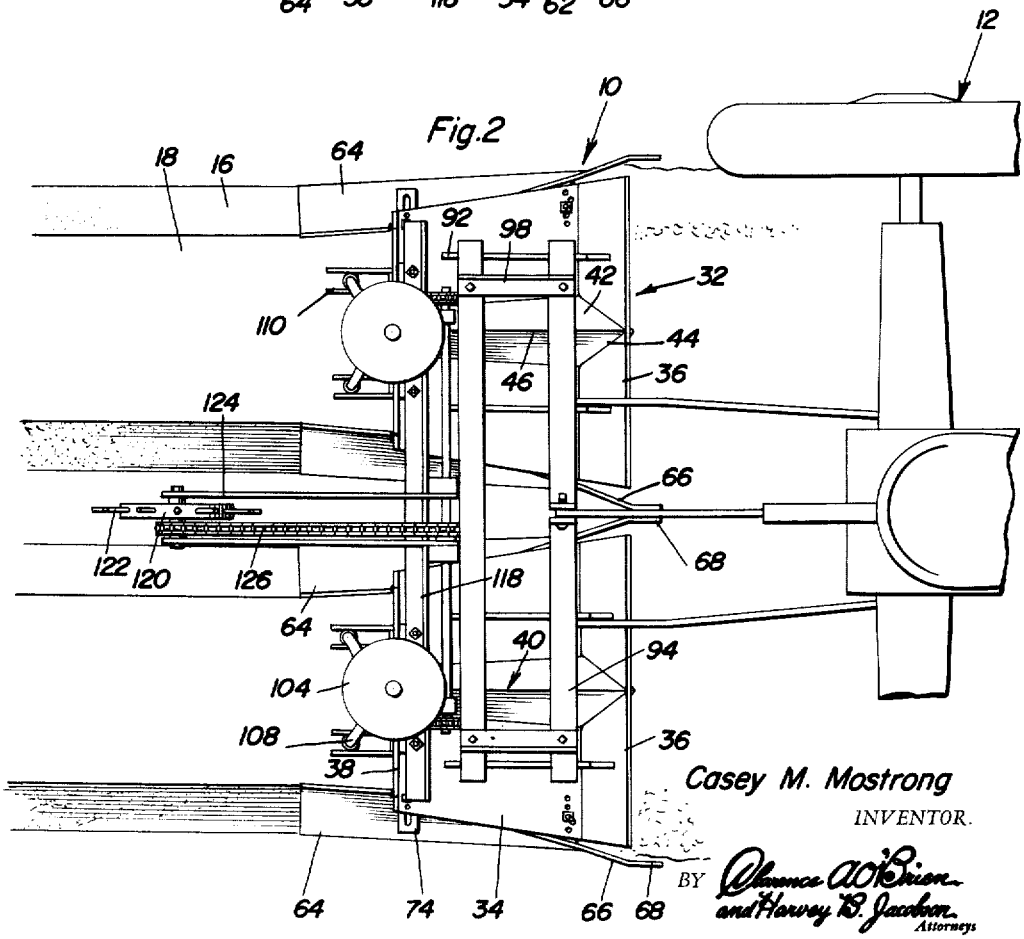
Casey M. Mostrong
INVENTOR.
BY Clarence A. O'Brien and Harvey B. Jacobson
Attorneys

PLANT BED SHAPER

Original Filed Feb. 18, 1959 3 Sheets-Sheet 2

Casey M. Mostrong
INVENTOR.

BY Clarence A. O'Brien and Harvey B. Jacobson
Attorneys

PLANT BED SHAPER

Original Filed Feb. 18, 1959 3 Sheets-Sheet 3

Casey M. Mostrong
INVENTOR.
BY Clarence A. O'Brien and Harvey B. Jacobson
Attorneys United States Patent Office Re. 25,439

Reissued Sept. 3, 1963

25,439

PLANT BED SHAPER

Casey M. Mostrong, P.O. Box 1011, El Centro, Calif.

Original No. 2,975,842, dated Mar. 21, 1961, Ser. No. 794,040, Feb. 18, 1959. Application for reissue Aug. 23, 1962, Ser. No. 219,376

7 Claims. (Cl. 172—252)

Matter enclosed in heavy brackets [ ] appears in the original patent but forms no part of this reissue specification; matter printed in italics indicates the additions made by reissue.

The present invention generally relates to a device for shaping and forming plant beds and more particularly to such a device for forming and shaping a raised plant bed of various sizes *and for compacting the sides of the beds* so that precise furrows are provided between raised bed rows with the furrows acting as means for conducting irrigation water between rows adjacent to the plant roots, the device being normally drawn behind a wheeled tractor of the type conventionally employed on farms and which is usually provided with a hydraulic power system, a power take-off and a power lift mechanism, the shaper being somewhat in the nature of a sled drag which not only shapes the seed bed rows *and compacts the sides of the beds,* but also shapes the furrow for providing a uniform size of seed bed and uniform size of furrow between the adjacent rows of seed bed.

Another object of the present invention is to provide a seed bed forming and shaping device in the form of a drag sled adapted to be pulled by a tractor which will not only form a seed bed with a smooth top surface, but also a raised seed bed with a peak therein commonly known as a salt ridge.

A further important object of the present invention is to provide a plant bed shaper incorporating conventional structural component parts which will not only accurately form the slope side walls or side surfaces of a plant bed but which will also accurately and positively form the top surface thereof for receiving the seed or seedlings.

Yet another feature of the present invention is to provide a plant bed shaper in accordance with the preceding objects which is simple in construction, provided with a minimum of moving parts, adaptable for use in forming different sizes and shapes of seed beds and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevation of the plant bed shaper of the present invention illustrating the same towed behind a tractor and illustrating a dispenser mounted thereon and driven by a ground engaging drive wheel;

FIGURE 2 is a plan view of the construction of FIGURE 1;

Figure 3:
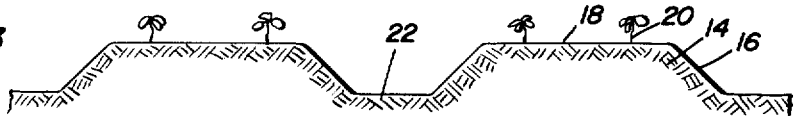
FIGURE 3 is a schematic view illustrating one type of seed bed formed with the present invention.
Figure 4:
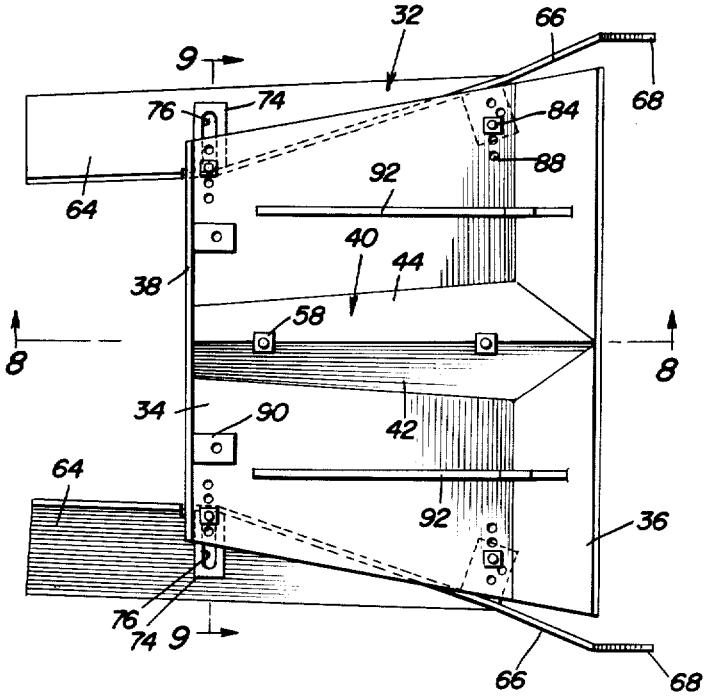
FIGURE 4 is a plan view of one of the shapers.
Figure 5:
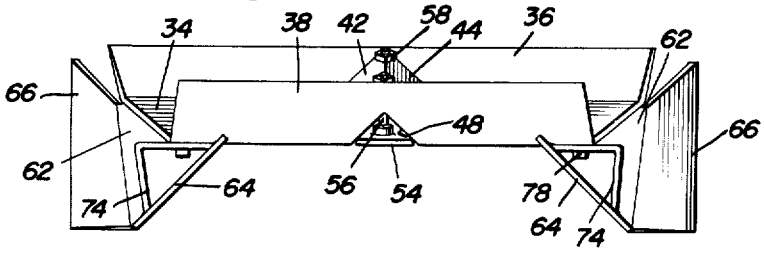
FIGURE 5 is a rear end view of the shaper of FIGURE 4.
Figure 8:
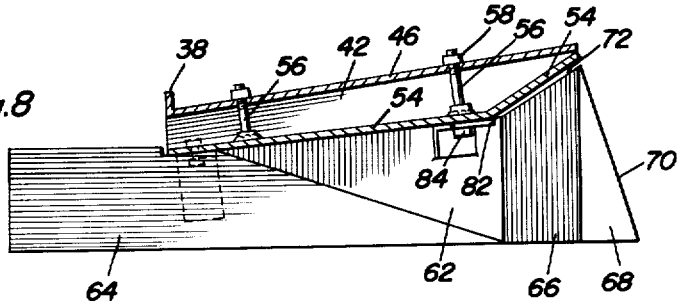
Figure 9:
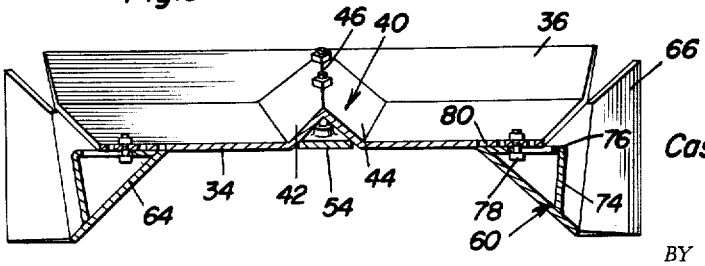

FIGURE 8 is a longitudinal, vertical sectional view taken substantially upon a plane passing along section line 8—8 of FIGURE 4 illustrating the details of construction of the shaper and illustrating the removable plate for forming either the flat type raised plant bed or the peak type raised plant bed; and FIGURE 9 is a transverse, sectional view taken substantially upon a plane passing along section line 9—9 of FIGURE 4 illustrating the structure of the plant bed shaper and particularly the means for adjusting the width of the plant bed.

Figure 6:
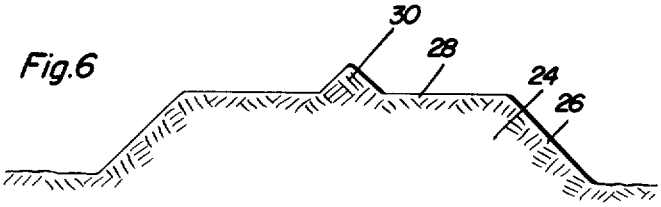
FIGURE 6 is a schematic view illustrating the raised peak plant bed or salt ridge.

Referring now particularly to the drawings, the numeral 10 generally designates the plant bed shaper of the present invention which is illustrated as being drawn by a tractor 12 of conventional construction and of the wheel type. The shaper 10 is provided for forming a raised seed bed 14 having inclined or sloping side surfaces 16 and a flat top surface 18 for receiving two rows of seedlings 20 or seed from which the seedlings will sprout. Between the plant beds 14 is a flat bottom furrow 22 which will receive irrigation water for providing water adjacent the roots of the plants or seedlings 20. In FIGURE 6, there is illustrated a different type of plant bed which is designated by the numeral 24 which includes the same sloped side surfaces 26 and a flat top surface 28 but with the flat top surface 28 having a peak or ridge 30 therein which is commonly referred to as a salt ridge. Other than this salt ridge 30, the plant bed 24 is the same as the plant bed 14.

Referring now specifically to FIGURES 4–9 of the drawings, it will be seen that each plant bed 14 or 24 is formed by a separate plant bed shaper generally designated by the numeral 32 and it is pointed out that several of these plant bed shapers may be connected together in an assembly 10 such as that illustrated in FIGURES 1 and 2.

Each shaper 32 includes a generally laterally extending top plate 34 *having a main section* which inclines upwardly and forwardly. The forward edge of the *main section of* top plate 34 is turned upwardly and the upturned front [edge] portion is designated by the numeral 36. The front [edge] *portion* 36 is inclined in relation to the horizontal and is in acute angular relation to the horizontal surface formed by the shaper. The rear edge of the *main section of the* plate 34 is also turned upwardly, this edge being designated by the numeral 38 and generally extending in a perpendicular manner to the *main section of the* top plate 34.

Disposed centrally in the *main section of the* top plate 34 is an inverted V-shaped ridge generally designated by the numeral 40 and defined by a pair of upwardly inclined plates 42 and 44 joined along the ridge 46. The ridge 46 extends in a downwardly sloping relation from the front to the rear of the *main section of the* plate 34, the front edge thereof being generally coincidental with the top edge of the upturned edge *of portion* 36 and the rear edge thereof being disposed below the top edge of the upturned rear edge 38. The upturned rear edge 38 is also provided with an inverted V-shaped notch 48 corresponding to the opening of the rear edge of the ridge 40 and the upturned [plate] *portion* 36 is also provided with an opening 50 corresponding to the front edge of the opening defined by the ridge 40 where it intersects the plate 34.

Figure 7:
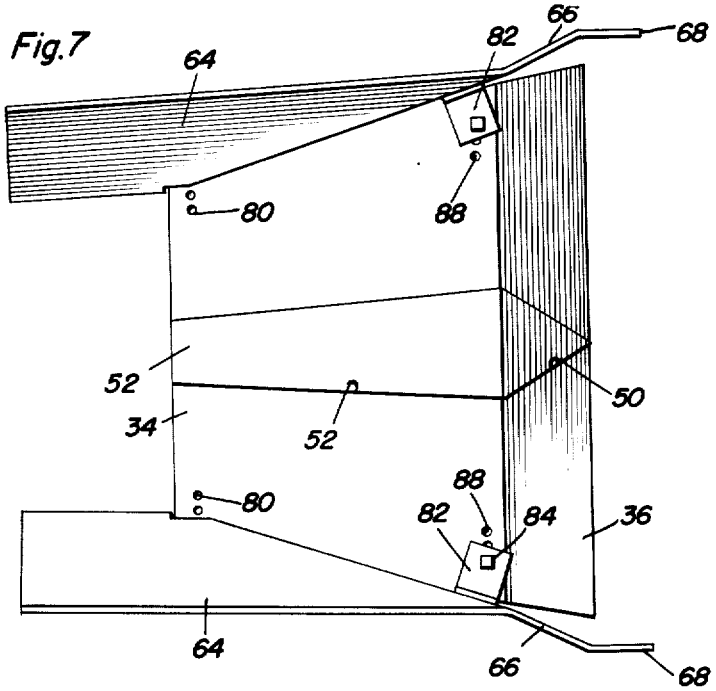
FIGURE 7 is a bottom plan view of the shaper of FIGURE 4.

Forming a closure for the bottom of the ridge 40 which bottom opening is defined by the reference numeral 52 is a plate 54 of the same size and configuration as the opening 52 in the *main section of* plate 34 and also the opening 50 in the upturned [edge] *portion* 36. The plate 54 is provided with a pair of bolts 56 welded or otherwise rigidly secured thereto, the bolts 56 extending upwardly through the ridge 46 and being provided with nuts 58 on the upper end thereof for detachably securing the closure plate 54 in position. When the closure plate 54 is in position, the undersurface of the upturned [edge] *portion* 36 and the undersurface of the *main section of* top plate 34 are smooth as illustrated in FIGURE 7 thus forming the smooth top ridge 14. However, when the nuts 58 are loosened and the plate 54 is removed, the shaper will then form the seed bed with the ribs 30 therein, this seed bed being illustrated in FIGURE 6 with the peak or ridge 30 being formed by the inverted V-shaped recess or ridge 40. Thus by placing the plate 54 in position or removing the same, the shaper may be used to form either the flat top seed bed 14 or the ridge or peak type seed bed 24.

Each side of the *main section of the top* plate 34 is connected to a side member 60. Each side member includes a pair of [wings] *wing sections* 62 having inclined trailing portions 64 and outwardly flared forward portions 66, each of the outwardly flared forward portions 66 having a forwardly extending triangular portion 68 with an inclined forward edge 70. As illustrated in FIGURE 7, the triangular portions 68 extend substantially in parallel relation and forwardly of the leading edge of the upturned [edge] *portion* 36 of the plate 34. The outwardly flared portions 66 are generally disposed vertically and flare outwardly in such a manner that they diverge from the side edges of the upturned edge 36, but the flared portions 66 also include an upwardly inclined top edge 72 generally conforming to the contour of the upwardly flared or upturned front edge *portion* 36 thereby guiding and gathering the soil so that it will pass into the interior of the shaper. The main body portions of the [wings] *wing sections* 62 are also vertical and are angulated inwardly or in rearwardly converging relation. The trailing portions 64 are inclined upwardly and inwardly and extend under the *main section of the* plate 34. Each of the side members 60 is adjustably attached to the plate member 34 for varying the width of the seed bed to be formed.

The means for attaching the rear portion 64 of each side member 60 to the plate 34 is an L-shaped bracket 74 rigidly secured to the outer surface of the trailing portion 64 with the horizontal leg thereof having a slot 76 for receiving a fastening bolt 78 therethrough. The fastening bolt 78 also extends through one of a series of laterally spaced openings 80 in the plate 34 thereby varying the position of the trailing portion 64 of the side member 60 in relation to the rear edge of the top plate 34.

For adjustably supporting the forward end of the wing [member] *section* 62 to the plate 34, the wing [member] *section* 62 is provided with an inwardly directed lug 82 which underlies the surface of *the main section* of the top plate 34 and is secured thereto by a fastening bolt 84. The fastening bolt 84 extends through one of a series of laterally spaced openings 88 in *the main section of* the top plate 34 thereby forming means for adjustably securing the front of the side member to the plate 34. Thus, by adjusting the position of the bolts 78 and 84, the position of the side members 60 in relation to the top plate 34 may be adjusted. This adjustment provides the formation of plant beds of different widths with the shaper forming either of two aforementioned types of plant beds.

In operation, the forwardly diverging or outwardly flared portion 66 as well as the portions 68 gather in the ridged soil which has been previously formed generally in cultivated ridges by a cultivator and plow for the same purpose. The shaper gathers this material and partially packs and smooths off the plant bed. The converging relation of the [wings] *wing sections* 62 and the trailing portions 64 compacts the side surfaces of the plant bed while the downwardly inclined construction of the top wall 34 compacts the top surface thereof and forms either a flat top surface or a top surface with a salt ridge 30.

The upturned edge 38 is provided with a pair of apertured lugs 90 and a pair of upstanding attachment flanges 92 are provided intermediate the side edges of the plate 34 and the ridge 40 formed therein, the attachment flanges 92 extending upwardly and engaging the inner surface of the upturned edge 36 thus acting to rigidify the entire shaper. Thus, a series of the shapers 32 may be supported in an assembled relation and form a shaper assembly 10 for towing behind the tractor 12. For forming the assembly, there is a pair of transverse frame members 94 having a plurality of depending brackets 96 arranged in longitudinally spaced pairs for attachment to the flanges 92. The transverse members 94 are rigidly interconnected by a pair of longitudinal frame members 98 and the entire assembly is then attached to a conventional three point hitch mechanism generally designated by the numeral 100.

Supported from the apertured lugs 90 are mounting plates 102 carrying a seed or fertilizer hopper 104 which includes a dispenser mechanism 106 with an operating shaft for dispensing seed or fertilizer through a discharge tube or tubes 108 into a planting shoe or chute 110. The dispenser mechanism 106 is powered by a drive chain 112 driven from a lay shaft 114 supported on upstanding brackets 116 which are carried by a transverse frame member 118 supported on the lugs 90. A ground engaging drive wheel 120 with projecting studs 122 thereon is supported between a pair of trailing arms 124 pivotally supported from the lay shaft 114 and the ground engaging drive wheel 112 drives the lay shaft 114 through a sprocket chain 126 and suitable sprockets. Also, spring means may be provided for urging the arms 124 downwardly for engaging the drive wheel 120 with the ground. Thus, with the present invention, there is provided a plant bed shaper adapted for single or gang use and adapted for ease of assembly into gang use whereby a multiplicity of plant beds may be simultaneously shaped and planted whether the bed to be formed is of the conventional flat top type or of the type having a peak or salt ridge therein.

The particular structure and contour of the shaper provides for the gathering and crowding of the loose soil into the device as it is drawn in the direction of travel, the soil being further compacted by the trailing wing [portions] *sections* with the size and shape of the bed being formed being capable of variation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a shaper for forming plant beds selectively with a flat top surface and with a peak ridge on the top surface, the combination of a pair of side members, a top plate disposed above said side members and provided with an upturned front portion, said top plate also being provided with an elongated ridge of an inverted V-shaped cross-section having an open bottom at the underside of the top plate and an open front at the upturned front portion of the top plate whereby to form a plant bed with a flat top surface and with a peak ridge on the top surface, a filler plate for closing the open bottom and the open front of said ridge whereby to form a plant bed with a flat top surface only, and means for removably securing said filler plate to said top plate.

2. In an assembly for shaping raised plant beds, a shaper comprising a laterally extending top plate disposed in a forwardly and upwardly inclined relation, the forward edge of said top plate being flared upwardly, a pair of side members, means adjustably connecting the side members to the top plate, said side members generally being disposed in forwardly diverging relation for guiding loose soil between the side members and under the top plate for compaction thereof, each of said side members including a trailing upwardly and inwardly inclined portion extending rearwardly of the top plate for further compaction of the side surfaces of the plant bed thereby providing a compacted plant bed raised above the surface between the plant beds so that irrigation water may run down the surface between the plant beds, said top plate being provided with a longitudinally extending inverted V-shaped recess tapering rearwardly to form and compact a peak ridge on the top surface of the plant bed, and a filler plate for closing the recess thereby providing a flat top surface for the plant bed, said filler plate being removably attached to the top plate whereby the shaper may be selectively used for forming flat top plant beds or peaked plant beds.

3. A sled drag type of assembly for towing by a tractor and shaping plant beds and planting seed therein comprising a plurality of shapers, a transverse frame assembly retaining the shapers in laterally spaced position, a plurality of material dispensers mounted on said shapers, a trailing drive wheel for operating said dispensers, said trailing drive wheel being supported from said shapers, each of said shapers including a top plate disposed in rearwardly and downwardly inclined relation to the path of travel, and a pair of side members connected to said top plate, said side members converging rearwardly in the direction of the path of movement thus gathering in loose soil and cooperating with the top plate for compacting the loose soil into raised seed beds for deposit of seed or other material with the furrows between the raised seed beds receiving irrigation water, each top plate being provided with an inverted V-shaped tapered ridge extending longitudinally therein for forming a peaked plant bed, and a removable filler plate attachable to the plate at the underside of said ridge for forming seed beds with a flat top surface.

*4. A shaper for forming raised plant beds and for compacting the soil while being so shaped, comprising:*

*(A) a laterally extending top plate including:*

*(1) a main section extending upwardly and forwardly throughout the length thereof,*

*(2) and including an upwardly and forwardly extending portion, the rear thereof merging with the front edge of the main section, said portion being shorter than the main section and having a greater horizontal width at the front edge than at the line of merger with the front of the main section;*

*(B) a pair of side members, each of said side members including:*

*(1) a section underlying the main section of the top plate,*

*(2) a wing section extending rearwardly of the main section of the top plate;*

*(3) and a portion extending forwardly of the main section of the top plate,*

*(4) the lower edges of said sections lying in a horizontal plane throughout the length thereof, and, the upper edges of the section underlying the underside of the main section being in engagement with said underside thereby spanning the space between said main section of the top plate and the ground,*

*(5) said side members angling outwardly downwardly through the length thereof,*

*(6) said side members converging rearwardly throughout the length thereof;*

*(C) and means for securing the side members to the main section of the top plate.*

*5. A sharper for forming a raised plant bed and for compacting the soil while being so shaped, as defined in claim 4, characterized in that the means is adjustable for varying the distance between the side members.*

*6. A shaper for forming raised plant beds and for compacting the soil while being so shaped, comprising:*

*(A) a laterally extending top plate including:*

*(1) A main section extending upwardly and forwardly throughout the length thereof,*

*(2) and including an upwardly and forwardly extending portion, the rear thereof merging with the front edge of the main section, said portion being shorter than the main section and having a greater horizontal width at the front edge than at the line of merger with the front of the main section;*

*(B) a pair of side members, each of said side members including:*

*(1) a section underlying the main section of the top plate,*

*(2) and a portion extending forwardly of the main section of the top plate,*

*(3) the lower edges of said side sections lying in a horizontal plane throughout the length thereof, and, the upper edges of the section underlying the underside of the main section being in engagement with said underside thereby spanning the space between said main section of the top plate and the ground,*

*(4) said side members angling outwardly downwardly through the length thereof,*

*(5) said side members converging rearwardly throughout the length thereof,*

*(6) and said forwardly extending portions of the side members converging rearwardly to a greater degree than the section of the side members which underly the main section of the top plate;*

*(C) and means for securing the side members to the main section of the top plate.*

*7. A shaper for forming a raised plant bed and for compacting the soil while being so shaped, as defined in claim 6, characterized in that the means is adjustable for varying the distance between the side members.*

References Cited in the file of this patent or the original patent

UNITED STATES PATENTS

| | | |
|---|---|---|
| 208,668 | Berghold et al. | Oct. 8, 1878 |
| 260,720 | Weymouth | July 4, 1882 |
| 445,557 | Howard | Feb. 3, 1891 |
| 625,646 | Cox et al. | May 23, 1899 |
| 656,787 | Grange | Aug. 28, 1900 |
| 734,049 | Ekstrand | July 21, 1903 |
| 1,700,117 | Booth | Jan. 29, 1929 |
| 2,475,078 | Cherry | July 5, 1949 |
| 2,729,157 | Webb | Jan. 3, 1956 |

FOREIGN PATENTS

| | | |
|---|---|---|
| 31,450 | Austria | Jan. 25, 1908 |